United States Patent
Miyake

(10) Patent No.: US 8,625,176 B2
(45) Date of Patent: Jan. 7, 2014

(54) IMAGE FORMING APPARATUS CONFIGURED TO PERFORM A CALIBRATION OPERATION

(75) Inventor: Kazunori Miyake, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 205 days.

(21) Appl. No.: 13/323,351

(22) Filed: Dec. 12, 2011

(65) Prior Publication Data

US 2012/0154834 A1    Jun. 21, 2012

(30) Foreign Application Priority Data

Dec. 17, 2010    (JP) ................................. 2010-282235

(51) Int. Cl.
*H04N 1/46*    (2006.01)
(52) U.S. Cl.
USPC ............ 358/504; 358/1.9; 358/1.15; 358/518
(58) Field of Classification Search
None
See application file for complete search history.

(56) References Cited

U.S. PATENT DOCUMENTS

| 7,408,682 | B2 * | 8/2008 | Ide ................................. 358/461 |
| 8,149,480 | B2 * | 4/2012 | Shiraishi ....................... 358/504 |
| 8,223,360 | B2 * | 7/2012 | Yamanaka .................... 358/1.15 |
| 2008/0008488 | A1 * | 1/2008 | Kaji et al. ........................ 399/67 |

FOREIGN PATENT DOCUMENTS

| JP | 2005-017459 A | 1/2005 |
| JP | 2007-159298 A | 6/2007 |

* cited by examiner

*Primary Examiner* — Dung Tran
(74) *Attorney, Agent, or Firm* — Canon U.S.A., Inc. IP Division

(57) ABSTRACT

An image forming apparatus includes an image forming unit, a calibration unit, a determination unit, and a control unit. The calibration unit is configured to perform a calibration operation including forming a measurement image by the image forming unit to adjust an image forming condition. The determination unit is configured to determine available electric energy allowed to be used by the image forming apparatus. The control unit is configured to determine an interval at which to perform the calibration operation based on the available electric energy determined by the determination unit and control the calibration unit to perform the calibration operation each time the determined interval is reached.

9 Claims, 14 Drawing Sheets

IMAGE FORMING APPARATUS CONFIGURED TO PERFORM A CALIBRATION OPERATION

BACKGROUND OF THE INVENTION

1. Field of the Invention

Embodiments of the invention relate to an image forming apparatus connected to a power monitoring apparatus via a network.

2. Description of the Related Art

In recent years, there has been concern about global warming caused by an increase in greenhouse effect gases, such as carbon dioxide ($CO_2$), methane gas, etc., in the atmosphere. Thus, there is a strong need to reduce the amount of carbon dioxide emission that may cause the global warming. A large amount of carbon dioxide is exhausted at electric power plants to generate electric power. Therefore, there is also a demand for a reduction in electric energy generation.

Thus, there is a demand to limit electric energy supplied from electric energy plants to facilities. Also from the point of view of reducing cost, it is required to reduce the electric energy consumption.

In view of the above, various techniques have been proposed to reduce the total electric energy consumption in a facility. For example, it has been proposed to use a server to manage the amount of electric energy consumed by a plurality of apparatuses/devices connected to a particular network such that the plurality of apparatuses/devices operate effectively and stably.

More specifically, data is stored which indicates the amount of electric energy consumed every month by each apparatus (the cumulative sum of electric energy consumed in each month) connected to a network, and the amount of electric energy which will be consumed in this month is predicted based on the amounts electric energy consumed in the past (see, for example, Japanese Patent Laid-Open No. 2007-159298).

When an image forming apparatus is operated continuously, a color misregistration, a density shift, or other errors may occur due to various factors such as an increase in temperate inside the image forming apparatus, which may result in degradation in image quality. Therefore, the image forming apparatus needs to be periodically subjected to a calibration as to a color misregistration correction, a density shift correction, etc. To reduce electric energy consumed during a calibration operation, it is known to turn a fixing heater to a completely-off level or to a low temperature level during the calibration operation (see, for example, Japanese Patent Laid-Open No. 2005-017459).

As the frequency of use of the image forming apparatus increases, it is necessary to increase the number of times the calibration is performed to maintain high image quality. However, the increase in the frequency of the calibration results in an increase in electric energy consumption. In an environment in which the maximum electric energy consumption is limited, the increase in the frequency of the calibration results in a great reduction in remaining electric energy allowed to be consumed.

SUMMARY OF THE INVENTION

In view of the above, one disclosed aspect of the embodiments provides an image forming apparatus capable of changing a calibration interval depending on electric energy allowed to be consumed by the image forming apparatus.

The embodiments also provide an image forming apparatus that allows an increase in a calibration interval without a significant reduction in image quality.

In an aspect, an embodiment provides an image forming apparatus including an image forming unit, a calibration unit, a determination unit, and a control unit. The calibration unit is configured to perform a calibration operation including forming a measurement image by the image forming unit to adjust an image forming condition. The determination unit is configured to determine available electric power allowed to be used by the image forming apparatus. The control unit is configured to determine an interval at which to perform the calibration operation based on the available electric power determined by the determination unit and control the calibration unit to perform the calibration operation each time the determined interval is reached.

Further features of the embodiments will become apparent from the following description of exemplary embodiments with reference to the attached drawings.

DESCRIPTION OF THE EMBODIMENTS

One disclosed feature of the embodiments may be described as a process which is usually depicted as a flowchart, a flow diagram, a timing diagram, a structure diagram, or a block diagram. Although a flowchart or a timing diagram may describe the operations or events as a sequential process, the operations may be performed, or the events may occur, in parallel or concurrently. In addition, the order of the operations or events may be re-arranged. A process is terminated when its operations are completed. A process may correspond to a method, a program, a procedure, a method of manufacturing or fabrication, a sequence of operations performed by an apparatus, a machine, or a logic circuit, etc.

First Embodiment

Figure 1:
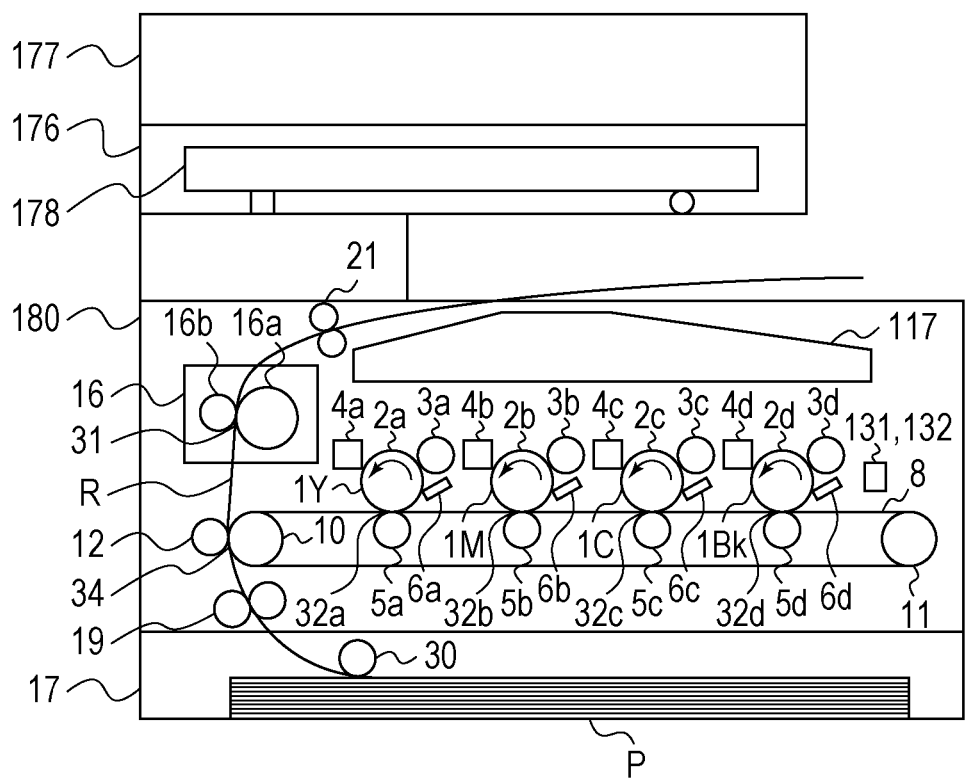
FIG. 1 is a cross-sectional view illustrating a structure of an image forming apparatus.

One disclosed aspect of the embodiments is described in further detail below with reference to embodiments in conjunction with the accompanying drawings. FIG. 1 is a cross-sectional view of an image forming apparatus 190 according to an embodiment. The image forming apparatus 190 includes a printing device 180, an image reading device 176, and a document conveying device 177.

The printing device 180 includes four image forming units, and more particularly, image forming units 1Y, 1M, 1C, 1Bk for forming images of yellow, magenta, cyan, and black, respectively. These fourth image forming units 1Y, 1M, 1C, and 1Bk are disposed at regular intervals in a single line. A paper feed unit 17 is disposed in the bottom of the printing device 180, and a recording sheet (paper) is fed along a conveying path R. A fixing unit 16 is disposed in an upper part of the printing device 180.

The respective units are described in further detail below. In each of the image forming units 1Y, 1M, 1C, and 1Bk, a drum-shaped electrophtographic photosensitive member (hereinafter, referred to as a photosensitive drum) 2a, 2b, 2c, or 2d serving as an image bearing member is disposed. Around each photosensitive drum 2a, 2b, 2c, or 2d, there are disposed a primary charger 3a, 3b, 3c, or 3d, a developing apparatus 4a, 4b, 4c, or 4d, a transfer roller 5a, 5b, 5c, or 5d, and a cleaning blade 6a, 6b, 6c, or 6d. A laser unit 117 is disposed above the set of image forming units 1Y, 1M, 1C, and 1Bk. The photosensitive drums 2a, 2b, 2c, and 2d are driven by a not-shown motor such that they rotate at a predetermined processing speed in a direction (counterclockwise direction) denoted by arrows. The primary chargers 3a, 3b, 3c, and 3d serving as primary charging units charge the respective photosensitive drums 2a, 2b, 2c, and 2d with a charging bias voltage applied from a charging bias power supply (not shown) such that the surface of each of the photosensitive drums 2a, 2b, 2c, and 2d is uniformly charged at a predetermined potential. The laser unit 117 includes a laser light emitting unit configured to emit laser light modulated according to an image signal, a polygon lens, a reflecting mirror, etc. The photosensitive drums 2a, 2b, 2c, and 2d are exposed to laser light such that electrostatic latent images corresponding to image information are formed on the surfaces of the respective photosensitive drums 2a, 2b, 2c, and 2d. The respective developing apparatuses 4a, 4b, 4c, and 4d have yellow toner, cyan toner, magenta toner, and black toner, stored therein, whereby these pieces of toner with different colors are deposited on the electrostatic latent images formed on the respective photosensitive drums 2a, 2b, 2c, and 2d to form toner images. The transfer rollers 5a, 5b, 5c, and 5d are disposed such that they may be in contact with corresponding photosensitive drums 2a, 2b, 2c, and 2d via an intermediate transfer belt 8 in respective primary transfer parts 32a to 32d whereby the toner images on the respective photosensitive drums may be sequentially transferred to the intermediate transfer belt 8 in such a manner that the respective toner images are superimposed. The cleaning blades 6a, 6b, 6c, and 6d serve to sweep away residual toner remaining on the photosensitive drums 2a, 2b, 2c, and 2d without being transferred to the intermediate transfer belt 8 thereby cleaning the photosensitive drums 2a, 2b, 2c, and 2d. The intermediate transfer belt 8 is disposed in a space on the lower side of the photosensitive drums 2a, 2b, 2c, and 2d such that the intermediate transfer belt 8 extend between a second opposing transfer roller 10 and a tension roller 11. The second opposing transfer roller 10 is disposed in a second transfer part 34 such that the second opposing transfer roller 10 is in contact with a second transfer roller 12 via the intermediate transfer belt 8. The image transferred to the intermediate transfer belt 8 is transferred, at the second transfer part 34, to a recording sheet conveyed from the paper feed unit 17.

The paper feed unit 17 feeds recording sheets P from a cassette in which a stack of recording sheets P is stored such that one recording sheet P is fed at a time using a pickup roller 30. The recording sheet P fed out from the paper feed unit 17 is conveyed to a registration roller 19. The registration roller 19 feeds the received recording sheet P into the second transfer part in synchronization with the timing of forming an image by the image forming units.

The fixing unit 16 includes therein a heater 116 such as a ceramic heater, a fixing film 16a, and a pressure roller 16b, whereby the toner image transferred to the recording sheet P is fixed by heating. When the recording sheet P is discharged from the fixing unit 16, the recording sheet P is further discharged onto a paper output tray by a paper discharge roller 21.

A color misregistration detection sensor 131 and a density detection sensor 132 are disposed at specific locations close to the tension roller 11 and above the intermediate transfer belt 8 such that the color misregistration detection sensor 131 and the density detection sensor 132 are arranged in a direction perpendicular to a conveying direction of the intermediate transfer belt 8 (in FIG. 1, they are arranged in a direction perpendicular to the page of the figure). The color misregistration detection sensor 131 is used to detect a color misregistration detection pattern image formed on the intermediate transfer belt 8 thereby to detect a relative registration error among images of the respective colors formed by the image forming units 1Y, 1M, 1C, and 1Bk. The density detection sensor 132 is used to detect a color density of a patch image formed according to an image signal of a particular color density thereby to perform a density shift correction. Note that the density detection sensor 132 is capable of also functioning as a color misregistration detection sensor. The color misregistration detection pattern and the patch image are included in the test pattern image as a measurement image.

Figure 2:
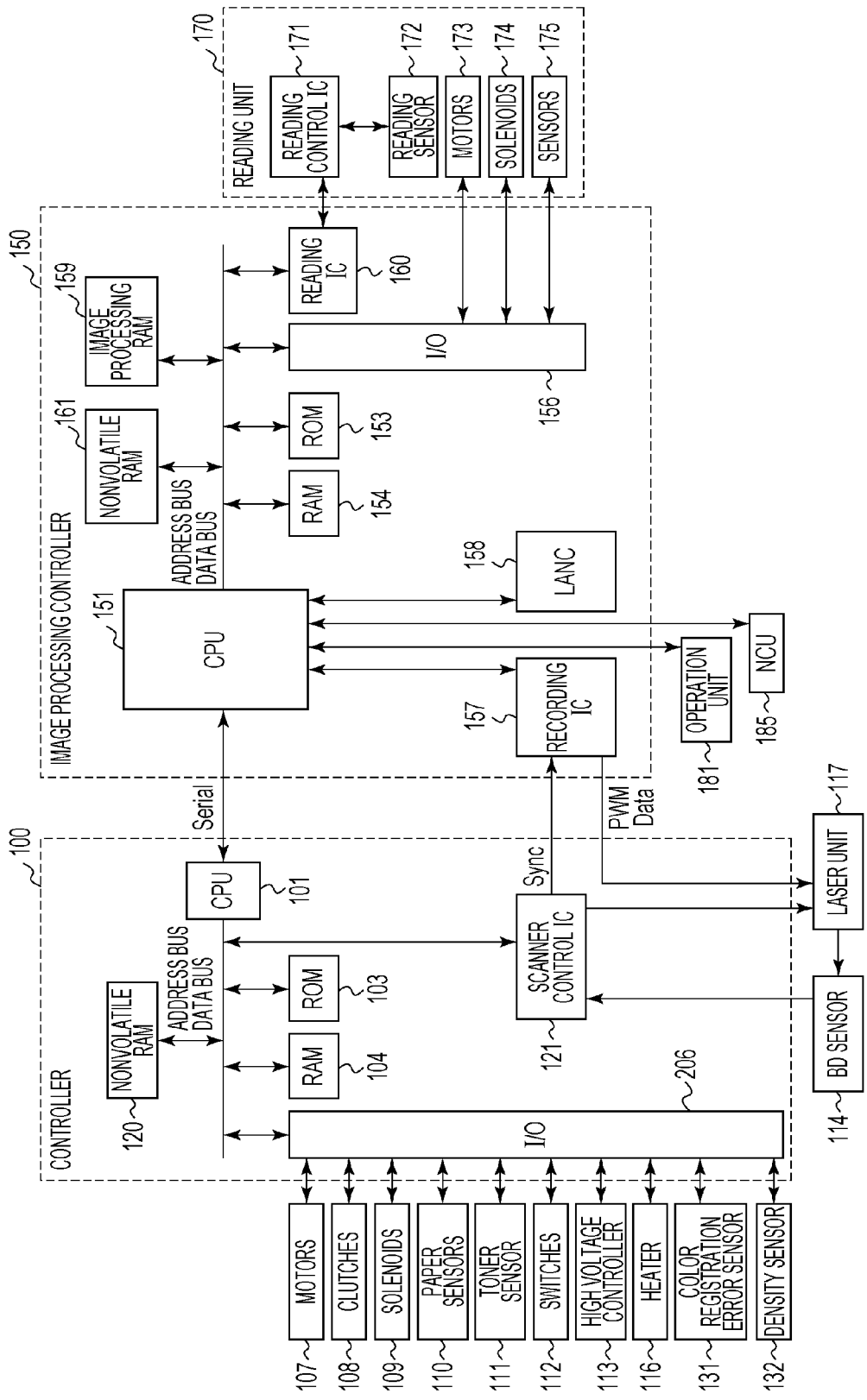
FIG. 2 is a block diagram illustrating a configuration of an image forming apparatus.

The image reading device 176 reads an image of a document using a reading sensor 172 disposed on a reading sensor substrate 178 and transmits the read image data to an image processing controller 150 (FIG. 2). The document conveying device 177 operates using a motor 173, a solenoid 174, a sensor 175, etc., such that documents placed in the form of a stack are sequentially fed one by one to the document reading unit 176.

FIG. 2 is a block diagram illustrating a configuration of the image forming apparatus 190. A controller unit 100 controls an image forming operation including the paper conveying operation by the printing device 180, a high voltage control operation, a laser control operation, the operation of the fixing unit, etc. A Central Processing Unit (CPU) 101 controls the printing device 180 according to a control program stored in a Read Only Memory (ROM) 103. The CPU 101 is connected to various parts of the image forming apparatus via an address bus or a data bus. A Random Access Memory (RAM) 104 is used to store input data and used as a work storage area. A nonvolatile RAM 120 stores parameters used in controlling of an image forming process. An Input/Output (I/O) interface 106 is connected to motors 107, clutches 108, and solenoids 109 for driving a paper feeding system, a conveying system, and an optical system. The I/O interface 106 is also connected to paper detection sensors 110 for detecting paper conveyed. Remaining toner sensors 111 are disposed in the respective developing apparatuses 4a to 4d to detect the amounts of toner remaining therein. Signals output from the remaining toner sensors 111 are input to an I/O port 106. Signals associated with switches 112 for detecting home positions of respective loads are also input to the I/O port 106.

A high voltage unit 113 outputs, under the control of the CPU 101, high voltages to the primary chargers 3a to 3d, the developing apparatuses 4a to 4d, and the transfer rollers 5a to 5d.

An image processing controller 150 performs image processing on an image signal supplied from a reading unit 170 or an external apparatus such as a personal computer (PC), and produces data that is to be supplied to the laser unit 117. The image data produced by the image processing controller 150 by performing image processing on the image signal supplied from the reading unit 170 may be stored in an external apparatus such as a PC or a storage medium such as a Universal Serial Bus (USB) memory or the like connected to an operation unit 181. A CPU 151 is disposed in the image processing controller 150 to perform the image processing according to an image processing control program stored in a ROM 153. A RAM 154 is used to store input data and also used as a work storage area. A recording integrated circuit (IC) 157 performs image processing on an image signal supplied from the reading unit 170 or an external apparatus such as a PC and produces Pulse Width Modulation (PWM) data to be supplied to the laser unit 117. Furthermore, the recording IC 157 turns on/off the laser disposed in the laser unit 117 according to the image data. The photosensitive drums 2a to 2d are exposed to laser light emitted from the laser unit 117. The light emission state is detected by a beam detect (BD) sensor 114 serving as a photosensor and an output signal (BD signal) from the BD sensor 114 is input to a scanner control IC 121. Based on the BD signal, the scanner control IC 121 outputs control signals such as a rotation control signal to control the rotation of a polygon motor (not shown) disposed in the laser unit 117, an image synchronization signal to control the image processing controller 150.

A nonvolatile RAM 161 is used as a storage area for storing parameters associated with the image processing. An I/O interface 156 is connected to motors 173, solenoids 174, sensors 175, and the like, disposed in the reading unit 170. A reading IC 160 processes the image data supplied from the reading sensor 172 disposed in the reading unit 170 and drives the reading sensor 172 via the read control IC 171. An image processing RAM 159 is used as a storage area for temporarily storing data in image processing on data received by the reading IC 160 or data received from the external apparatus such as the PC. The ICs described above are controlled by the CPU 151.

A Local Area Network (LAN) controller 158 controls communication performed with the external apparatus such as the PC connected via a LAN cable. The CPU 151 also controls the operation unit 181 that provides a user interface used by a user to operate the image forming apparatus 190 and controls a Network Control Unit (NCU) 185 for controlling facsimile communication. The CPU 101 of the controller unit 100 is connected, via serial communication, to the CPU 151 of the image processing controller 150. That is, while performing communication with each other, the CPU 101 and the CPU 151 controls the operation as to the timing of outputting the image data to the laser unit 117 of the image forming apparatus 190, the turning-on/off of the image forming apparatus 190, the turning into a sleep mode (power saving mode).

Figure 3:
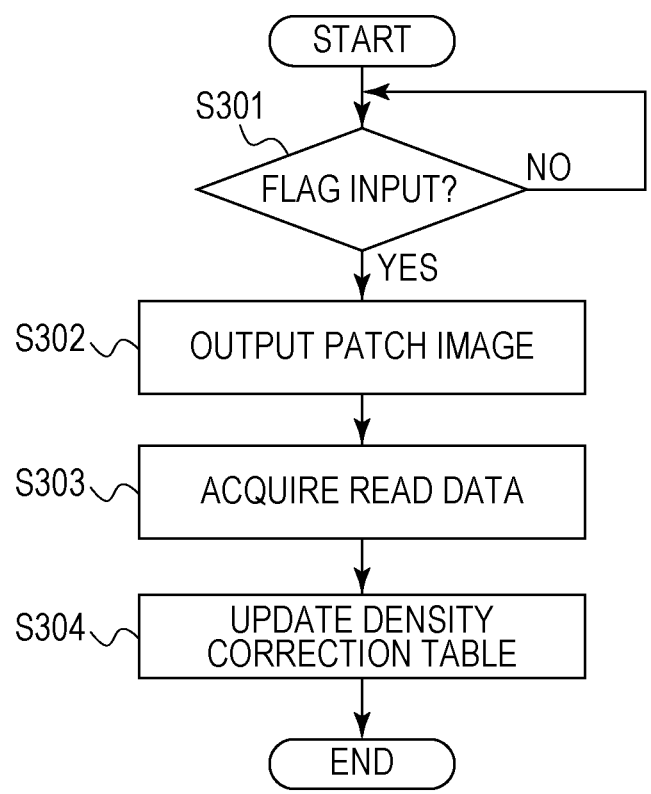
FIG. 3 is a flow chart illustrating a density error correction process in a calibration operation.

Next, the calibration operation is described below. FIG. 3 is a flow chart illustrating a density correction process in the calibration operation. The process illustrated in this flow chart is executed by the CPU 151. The CPU 151 determines whether a flag/interrupt signal is received from the CPU 101 (operation S301). The CPU 101 of the controller unit 100 outputs a flag/interrupt signal to the CPU 151 each time a predetermined number of sheets are printed. Upon receiving the flag/interrupt signal from the CPU 101, the CPU 151 commands the recording IC 157 to output density measurement image data stored in the nonvolatile RAM 161 (operation S302). Based on this density measurement image data, the CPU 101 forms a density measurement image on the intermediate transfer belt 8. The density measurement image is an image formed based on image data of a predetermined size/density. The density measurement image is also referred to as a patch image. To form the density measurement image, it is necessary to drive photosensitive drums 2a, 2b, 2c, and 2d, the intermediate transfer belt 8, and the laser unit 117 and it is also necessary to supply high voltages used in charging, developing, transferring, etc., and thus an electric energy consumption occurs in the image forming apparatus.

Figure 4:
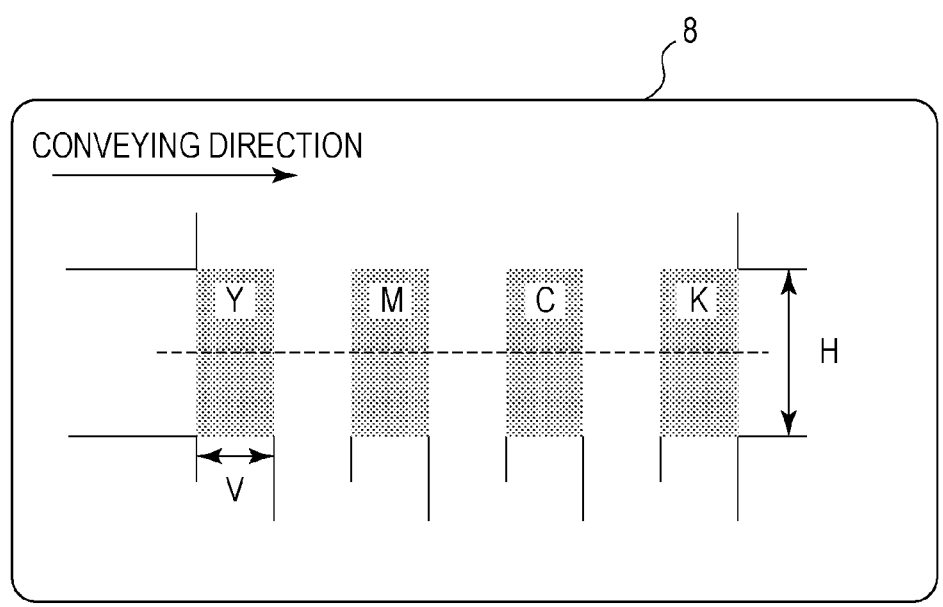
FIG. 4 is a diagram illustrating a patch image for use in a density error correction process.

FIG. 4 illustrates an example of a patch image. In this example, a patch image is formed for each color component. The patch image includes H image elements arranged in the main scanning direction perpendicular to the rotating direction of the photosensitive drum and V image elements arranged in the sub scanning direction which is the same as the rotating direction of the photosensitive drum.

Figure 5:
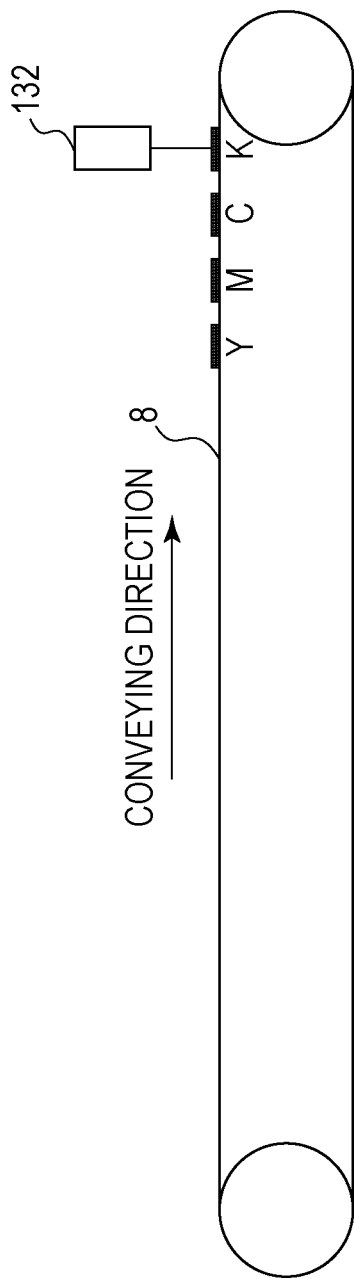
FIG. 5 is a diagram illustrating a manner in which a patch image is formed on an intermediate transfer member.

The CPU 101 reads the color density of each patch image element formed on the intermediate transfer belt 8 by using the density detection sensor 132. FIG. 5 illustrates a manner in which the patch image is measured by the density detection sensor 132. The CPU 151 acquires, from the CPU 101, the data read by the density detection sensor 132 (operation S303). If the read patch image has the color density identical to the density level indicated by the image data used to form the patch image, there is no problem. In the electrophtographic technique, the density characteristic may change with increasing number of printed sheets. In a case where the density level is expressed, for example, in values from 0 to 255, when the patch image of the density level 64 is formed, the detected density level may be greater or lower than 64. The shift of color density varies depending on environmental factors such as temperature, humidity, etc., inside or outside the printing apparatus and other factors relating to the printing conditions such as the amount of toner used in printing. Therefore, a range of a color density shift may be different, for example, between a case in which an almost-solid image is printed on a particular number of sheets of white paper and a case where an image including a large white area as in the case of an image of characters is printed on a particular number of sheets. The density control refers to a process to correct the density shift. More specifically, the CPU 151 adjusts the image forming conditions based on the color density read by the density detection sensor 132. For example, the adjustment performed by the CPU 151 is accomplished by modifying a correction table used in the density shift correction (operation S304).

Figure 6:
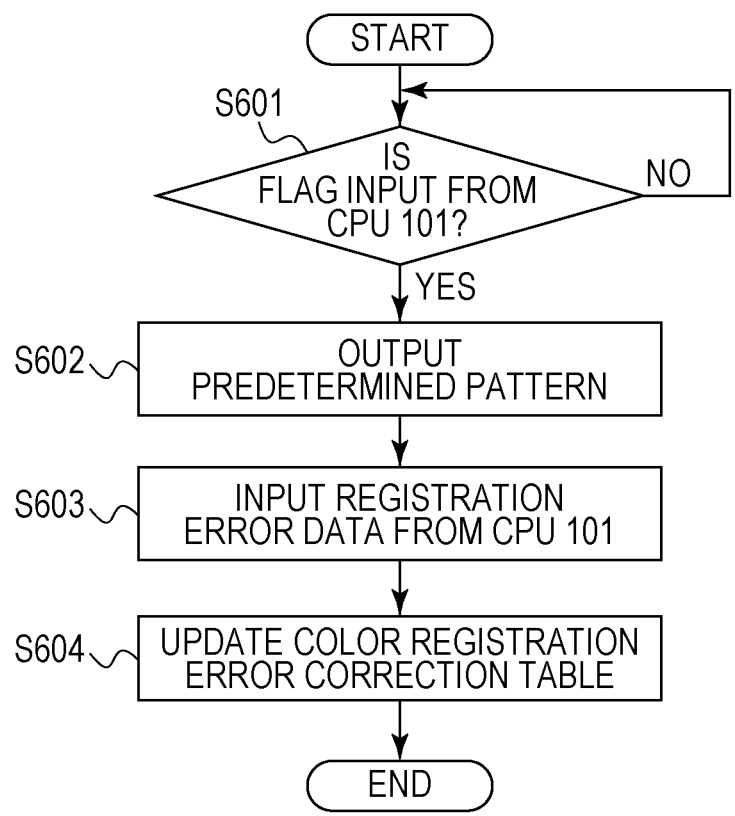
FIG. 6 is a flow chart illustrating a color misregistration correction process in a calibration operation.

FIG. 6 is a flow chart illustrating a color misregistration correction process in the calibration operation performed by the CPU 151. The CPU 151 of the image processing controller 150 determines whether a flag/interrupt signal is input from the CPU 101 of the controller unit 100 (operation S601). The CPU 101 outputs the flag/interrupt signal to the CPU 151 each time a predetermined number of sheets are printed. Upon receiving the flag/interrupt signal, the CPU 151 commands the recording IC 157 to output color misregistration measurement image data stored in the nonvolatile RAM 161 (operation S602). Based on this color misregistration measurement image data, the CPU 101 forms a color misregistration detection pattern image on the intermediate transfer belt 8 and reads the formed color misregistration detection pattern image by using the color misregistration detection sensor 131 and the density detection sensor 132.

Figure 7:
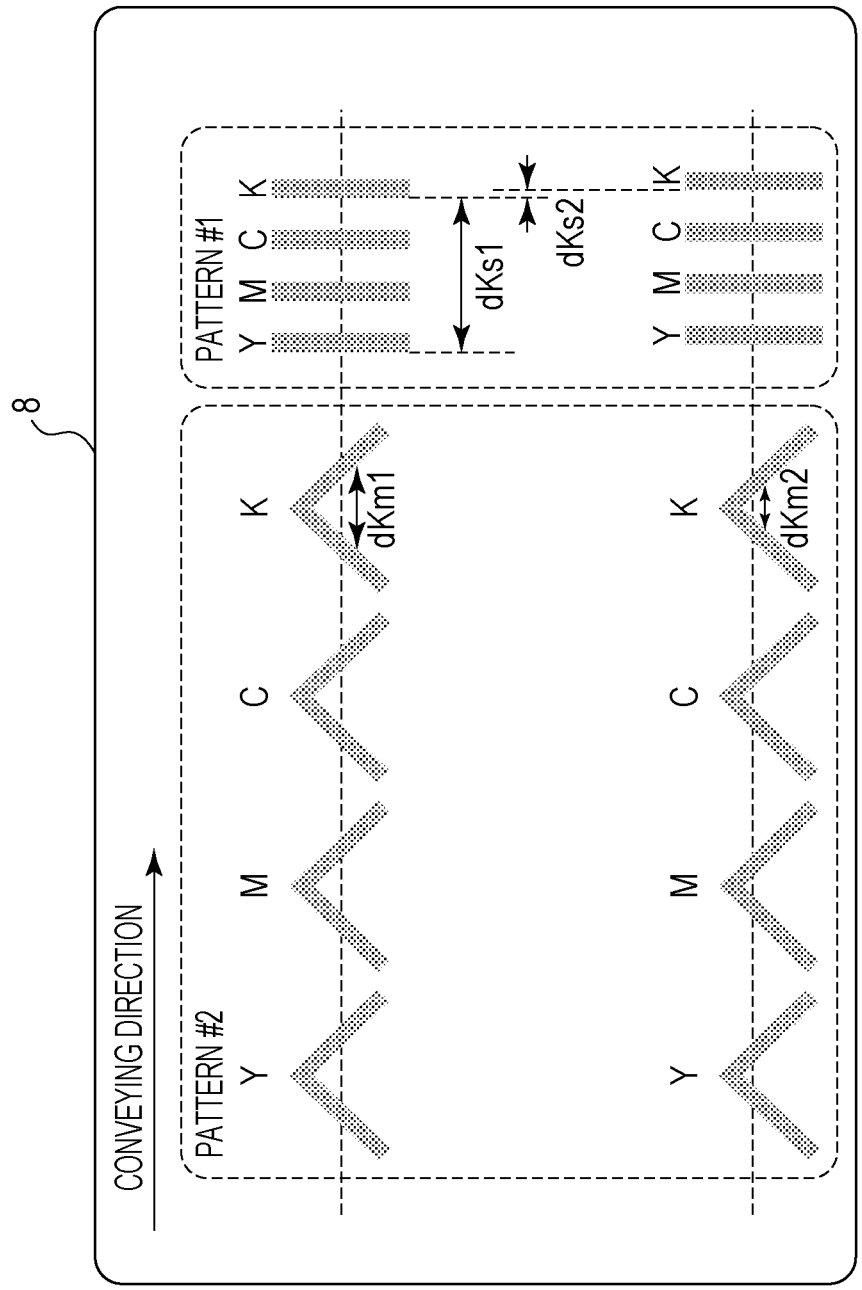
FIG. 7 is a diagram illustrating a test pattern image for use in a color misregistration correction process.

FIG. 7 illustrates an example of a color misregistration detection pattern image. At least two color misregistration detection sensors 131 are disposed in a direction (main scanning direction) perpendicular to a conveying direction of the intermediate transfer belt 8. One of them is also used as the density detection sensor 132. In FIG. 7, a pattern #1 is used to detect misregistration in the conveying direction (sub scanning direction) of the intermediate transfer belt 8 and an inclination with respect to the main scanning direction, while a pattern #2 is used to detect a shift in the main scanning direction and a magnification. If a shift of black K in the sub scanning direction occurs, the shift causes dKs1 in the pattern #1 to be different from the prescribed value. Thus, a correction associated with the shift of black K is performed such that dKs1 is equal to the prescribed value. On the other hand, if a shift in the main scanning direction occurs, the shift causes detected values of spaces denoted by dKm1 and dKm2 in the pattern #2 to be different from their prescribed values, and thus a correction associated with the spaces is performed such that these values are equal to the prescribed values. If an inclination with respect to the main scanning direction occurs, the inclination causes dKs2 to be different from 0, and thus a correction associated with the inclination is performed such that dKs2 is equal to 0. If the magnification varies depending on the position in the main scanning direction, the variation in the magnification causes dKm1 and dKm2 to be different from each other. Thus, a correction associated with the magnification is performed such that dKm1 and dKm2 are equal to each other. The correction processes may be performed using known techniques, and thus a further detail description thereof is omitted.

Figure 8:
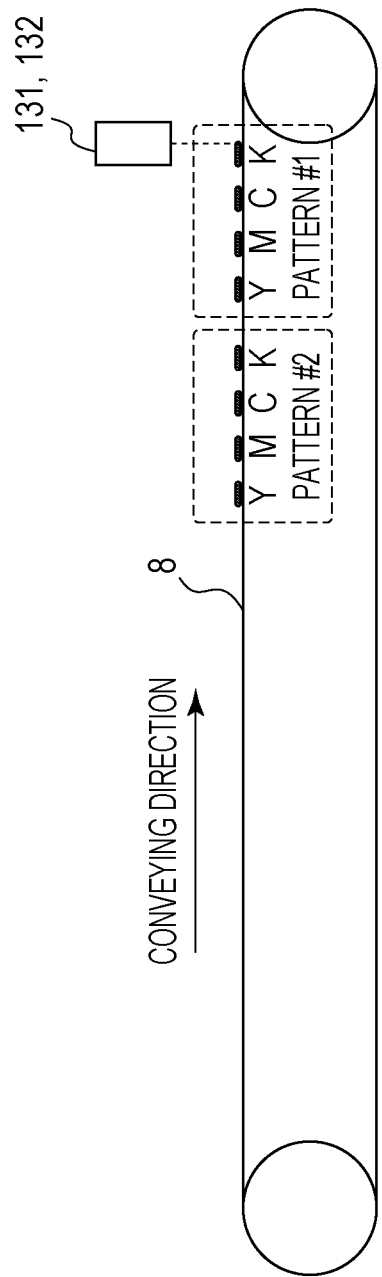
FIG. 8 is a diagram illustrating a manner in which a test pattern image for use in a color misregistration correction is formed on an intermediate transfer member.

FIG. 8 illustrates a manner in which the color misregistration detection pattern image formed on the intermediate transfer belt 8 is read. The color misregistration detection pattern image (the pattern #1 and the pattern #2) formed on the intermediate transfer belt 8 is read by the color misregistration detection sensor 131 and the density detection sensor 132, and the CPU 101 calculates the amounts of shift. Data indicating the resultant amounts of shift is transmitted to the CPU 151.

If the CPU 151 receives the data indicating the result of the test pattern image from the CPU 101 (operation S603), the CPU 151 determines, from the received data, correction data used to eliminate the color misregistration and updates the color misregistration correction table according to the determined correction data (operation S604).

Figure 9:
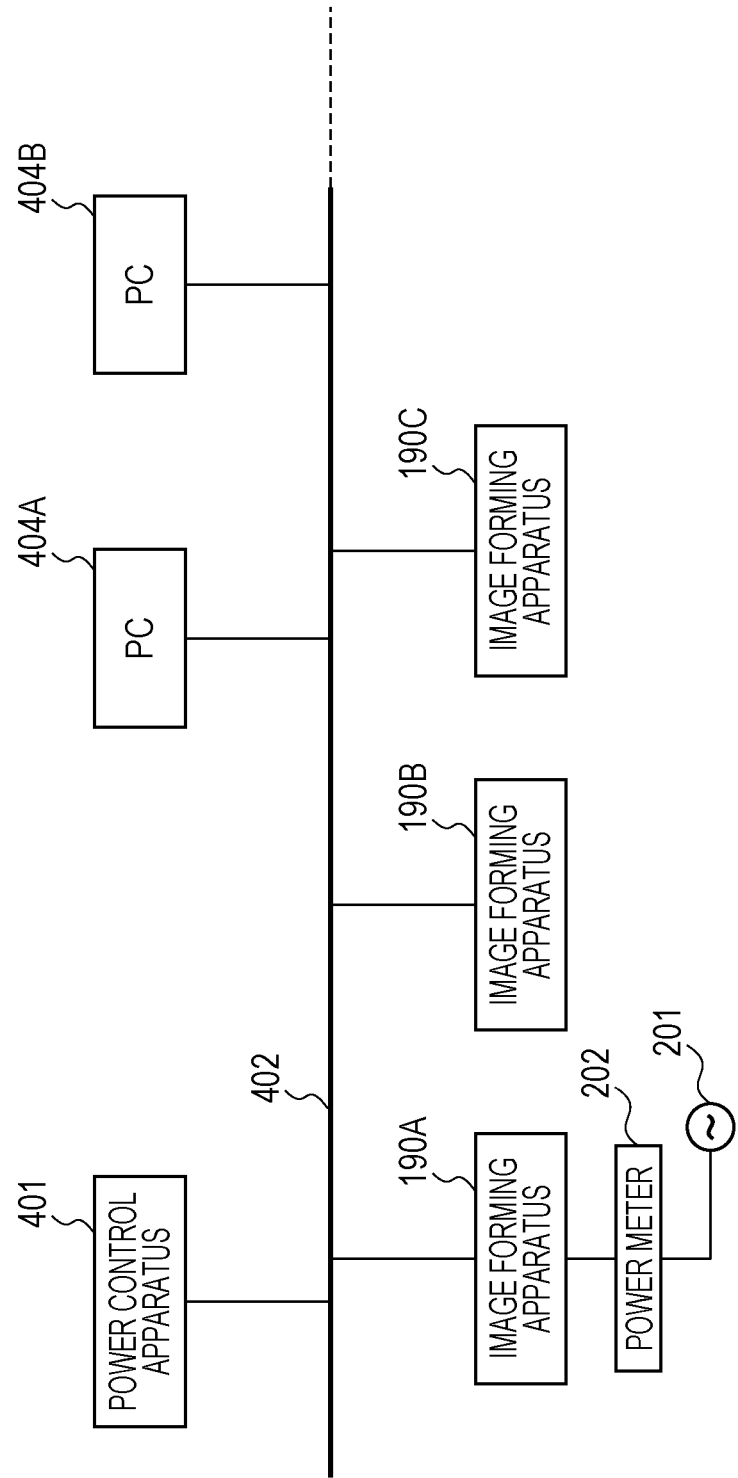
FIG. 9 is a diagram illustrating apparatuses connected to a network.

FIG. 9 is a diagram illustrating apparatuses connected via a network 402. A system formed by these apparatuses connected via the network 402 is referred to as an image forming system. In the image forming system according to the present embodiment, image forming apparatuses 190A, 190B, and 190C, PCs (Personal Computers) 404A and 404B are connected to a power management apparatus 401 via the network 402. The image forming apparatus 190A is connected to an electric energy meter 202. The electric energy meter 202 measures the cumulative sum of electric energy supplied from an alternating current (AC) power supply 201 and consumed (used) by the image forming apparatus A. Data indicating the consumed electric energy measured by the electric energy meter 202 is sent at scheduled intervals from the image forming apparatus 190A to the power management apparatus 401. The power management apparatus 401 manages the cumulative sum of the electric energy consumed by the image forming apparatus 190A. The image forming apparatuses 190B and 190C are also connected to their own electric energy meter. In the present image forming system, a host computer operates as the power management apparatus 401 and manages the total electric energy consumed by the network system so that the cost of the energy consumption is minimized and the system operates with high reliability. Data indicating the remaining electric energy allowed to be used by the image forming apparatuses (the remaining cumulative sum of electric energy allowed to be consumed) may be sent at scheduled intervals from the power management apparatus 401 to the respective image forming apparatuses. Alternatively, each image forming apparatus may receive the initial value of the remaining consumable electric energy from the power management apparatus 401 and the image forming apparatus may subtract the actually consumed electric energy from the initial value thereby acquiring the remaining electric energy allowed to be consumed.

Figure 10:
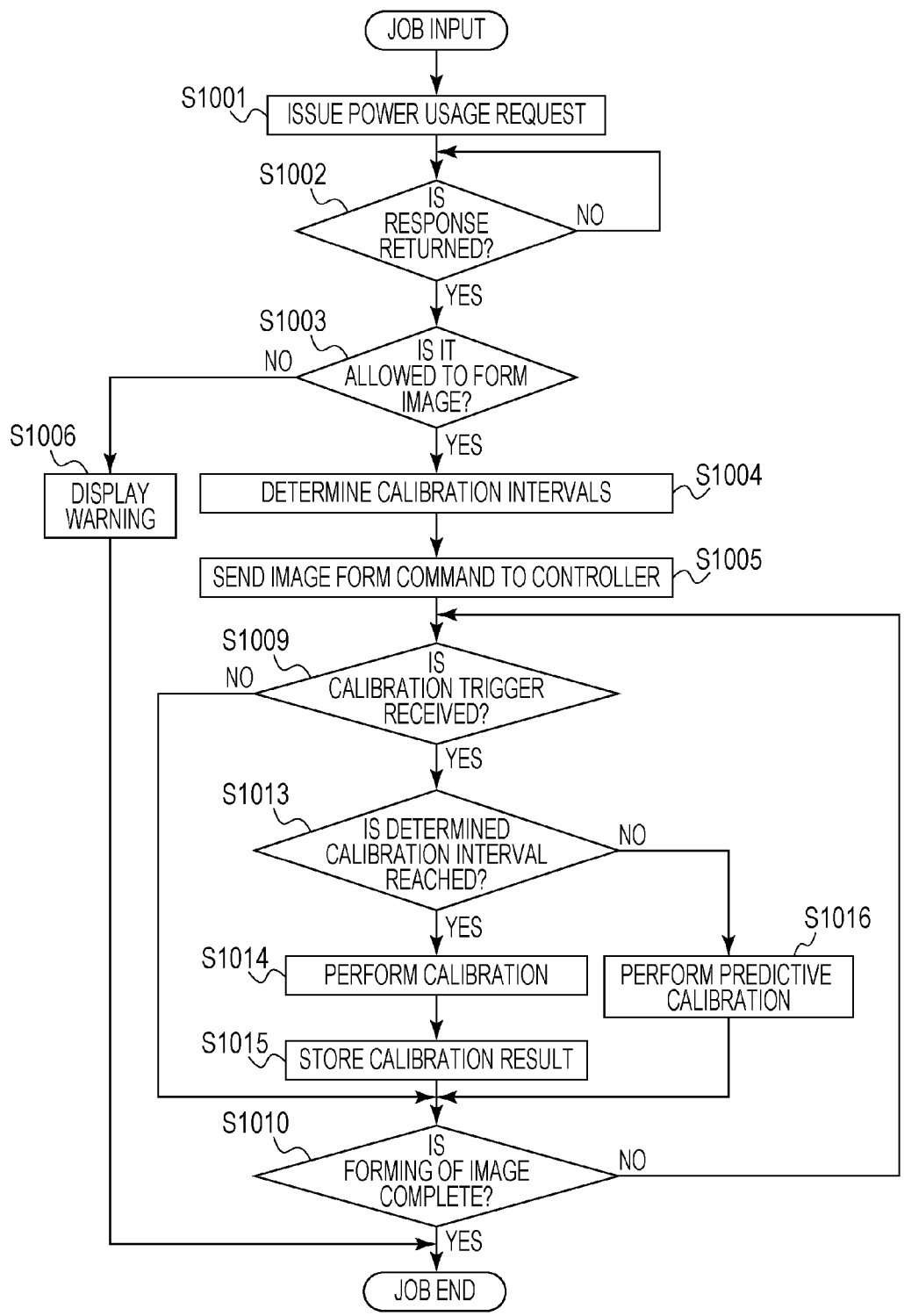
FIG. 10 is a flow chart illustrating a process of controlling an image forming apparatus.

FIG. 10 is a flow chart illustrating a control process performed when a print job is input to the image forming apparatus 190A connected to the network 402. Note that the other image forming apparatuses 190B and 190C may be controlled as with the image forming apparatus 190A. The image forming apparatus 190A is configured as shown in FIG. 2, and the process shown in the flow chart of FIG. 10 is performed by the CPU 151. If a print job is input to the image forming apparatus 190A, the CPU 151 sends a power usage request to the power management apparatus 401 via a LANC 158 (operation S1001). The CPU 151 waits for a response to the power usage request to be received from the power management apparatus 401 (operation S1002). If the response is received, the CPU 151 determines whether the response indicates that it is allowed to form an image (operation S1003). The response includes data indicating whether it is permitted to perform the image forming process and data indicating the remaining amount of electric energy allowed to be consumed (hereinafter also referred to simply as remaining electric energy). If it is not permitted to perform the image forming process, the CPU 151 displays a warning indicating that it is not allowed to perform the image forming process on the operation unit 181 (operation S1006), and the process is ended. If it is permitted to perform the image forming process, the CPU 151 determines the intervals at which the calibration is to be performed (operation S1004).

The greater the remaining electric energy is, the shorter the calibration intervals are set to be, while the smaller the remaining electric energy is, the longer the calibration intervals are set to be. For example, when the remaining electric energy is equal to or greater than 50% of the predetermined available electric energy Pa, the calibration interval is set to be equal to the default interval Td. In a case where the remaining electric energy is equal to 50% to 30% of the available electric energy Pa, the calibration interval is set to be equal to 2 times the default interval Td. For example, when the default interval is defined such that the calibration is performed each time 200 sheets are printed, the calibration is performed each time 400 sheets are printed. In a case where the remaining electric energy is equal to 30% to 10% of the available electric energy Pa, the calibration interval is set to be equal to 3 times the default interval Td. In a case where the remaining electric energy is less than 10% of the available electric energy Pa, the calibration interval is set to be equal to 4 times the default interval Td. The manner of setting the calibration interval is not limited to that described above, but the calibration interval may be set differently.

Thereafter, the CPU 151 issues a command to the CPU 101 to start the image forming operation (operation S1005). Upon receiving the command to start the image forming operation, the CPU 101 starts a preparatory operation including controlling of the temperature of the fixing heater 116 and activating of the polygon motor. If the preparatory operation is complete, the CPU 151 starts the image forming operation. If the preset timing condition associated with the calibration is satisfied during the execution of the print job, the CPU 101 transmits a calibration trigger signal to the CPU 151. More specifically, the timing condition is satisfied when the number of printed sheets reaches the value corresponding to the calibration interval determined depending on the remaining electric energy. When an environmental change (in terms of temperature, humidity, etc.) occurs, it may be regarded that the timing condition is satisfied.

The CPU 151 determines whether the calibration trigger signal is received from the CPU 101 (operation S1009). If the calibration trigger signal is not received, the CPU 151 determines whether the image forming operation is complete for all images in the input print job (operation S1010). If the image forming is complete, the process is ended. On the other hand, when the calibration trigger signal is received, the CPU 151 determines whether the number of sheets printed since the previous calibration has reached the calibration interval (the number of printed sheets) determined in operation S1004 (operation S1013). If the number of sheets printed since the previous calibration has reached the determined calibration interval, the CPU 151 executes the calibration operation described above with reference to FIG. 3 and FIG. 6 (operation S1014). The CPU 151 stores data in the nonvolatile RAM 120 as to the cumulative number of printed sheets as of the execution of the calibration, the environmental conditions such as temperature, the correction coefficients, etc. (operation S1015).

On the other hand, if the number of sheets printed since the previous calibration has not reached the determined calibration interval, a predictive calibration is performed (operation S1016). The predictive calibration refers to an operation of determining the correction coefficients based on calibration results obtained in a few previous calibration operations stored in the nonvolatile RAM 120, without forming a patch image by the image forming unit. More specifically, for example, based on results of a few calibration operations performed in the past, the number of sheets printed since the previous calibration operation, and changes in environmental conditions, the CPU 151 predicts the correction coefficients by calculating average values for results of calibration operations that are close to the current state in terms of the number of sheets printed and the changes in environmental conditions. The process described above is performed repeatedly until the input print job is ended.

Figure 11:
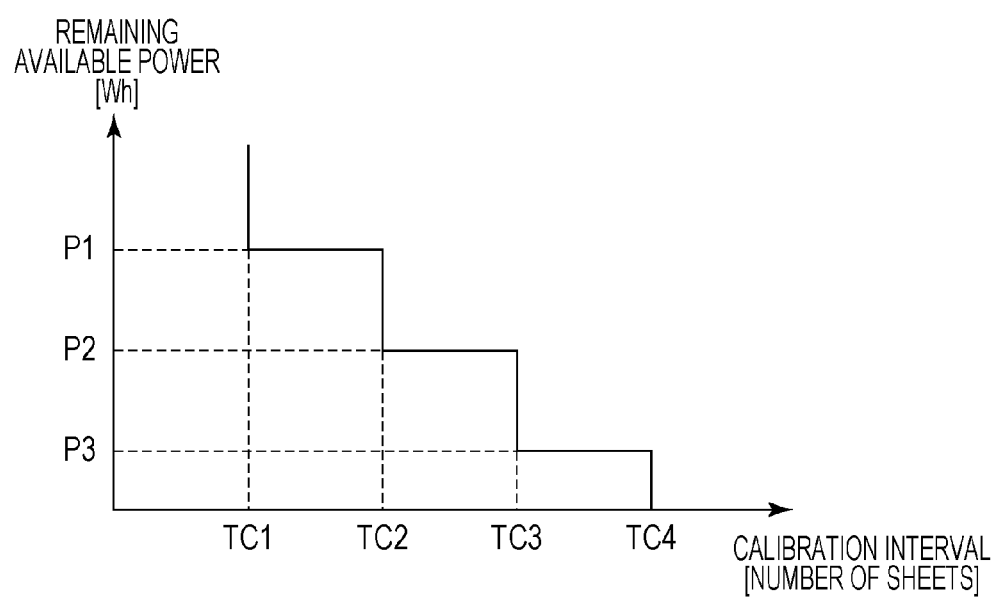
FIG. 11 is a graph illustrating a relationship between electric energy allowed to be consumed by an image forming apparatus and a calibration interval.

FIG. 11 is a graph illustrating a relationship between the calibration interval and the electric energy allowed to be consumed by the image forming apparatus 190A. A vertical axis indicates the electric energy (remaining electric energy) allowed to be used by the image forming apparatus 190A, and a horizontal axis indicates the calibration interval. The CPU 151 compares the remaining electric energy informed from the power management apparatus 401 with a plurality of threshold values (P1, P2, and P3) to determine which range the remaining electric energy falls in. P1 is a value corresponding to 50% of the predetermined initial consumable electric energy (the upper limit of the consumable electric energy). Similarly, P2 and P3 respectively correspond to 30% and 10% of the predetermined initial consumable electric energy. In a case where the remaining electric energy is equal to or greater than P1, the calibration using the patch image is performed each time TC1 sheets are printed. Note that TC1 corresponds to Td described above. TC1 is set in advance as an initial value in the image forming apparatus. In a case where the remaining electric energy is less than P1 and greater than or equal to P2, the calibration is performed each time TC2 sheets are printed. In this case, the calibration interval is larger than that for the case where the remaining electric energy is equal to or greater than P1. On the other hand, in a case where the remaining electric energy is less than P2 and greater than or equal to P3, the calibration interval is set to a greater value of TC3. In a case where the remaining electric energy is less than P3, the calibration interval is set to a further greater value of TC4. As described above, the calibration interval is increased with decreasing remaining electric energy to reduce the electric energy consumed by the image forming apparatus.

Figure 12:
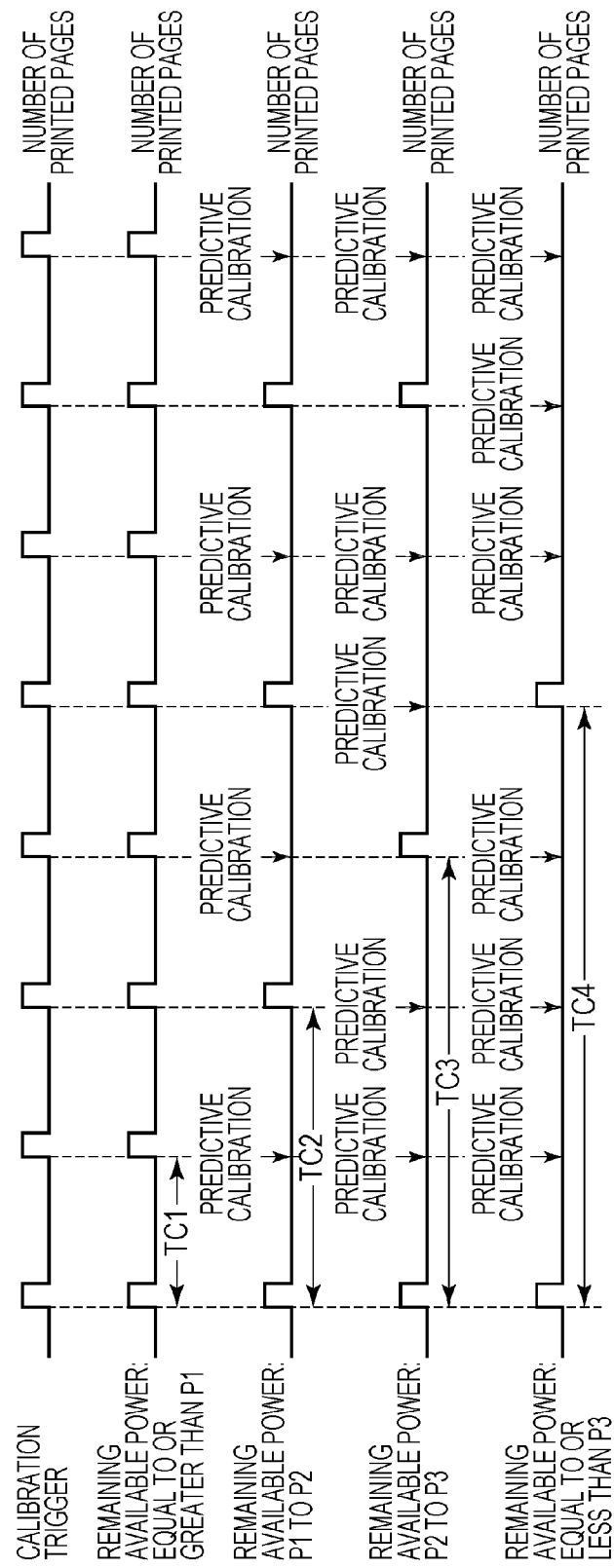
FIG. 12 is a timing chart illustrating calibration intervals for various values of electric energy allowed to be consumed by an image forming apparatus.

FIG. 12 is a timing chart illustrating the remaining electric energy and the calibration interval. Each time image forming apparatus 190A prints as many sheets as TC1, a calibration trigger signal is generated. In the case where the remaining electric energy is equal to or greater than P1, the calibration operation including forming the patch image is performed each time the calibration trigger is generated, i.e., each time TC1 sheets are printed. In the case where the remaining electric energy is less than P1 and greater than or equal to P2, the calibration operation is performed each time TC2 sheets are printed. In this case, the calibration operation is not performed in response to a (2n−1)th calibration trigger signal where n is an integer, but, instead, the correction coefficients are predicted (calculated) based on results of calibration operations performed in the past and the correction is performed according to the predicted correction coefficients. More specifically, the correction coefficients are determined such that a plurality of calibration operations which are similar to the current situation in terms of the number of sheets printed since the previous calibration operation and changes in environmental conditions are selected from calibration operations performed in the past, and average values of the selected calibration operations are calculated. This makes it possible to determine the correction coefficients without actually forming a patch image, which leads to a reduction in electric energy consumption. In the case where the remaining electric energy is less than P2 and greater than or equal to P3, the calibration operation is performed each time TC3 sheets are printed. In this case, when a (3n−2)th or (3n−1)th calibration trigger signal is generated, the predictive correction is performed. In the case where the remaining electric energy is less than P3, the calibration operation is performed each time TC4 sheets are printed. In this case, when a (4n−3)th, (4n−2)th, or (4n−1)th calibration trigger signal is generated, the predictive correction is performed.

In the embodiment described above, P1, P2, and P3 indicate particular values of the ratio of the remaining electric energy to the initial maximum (limited) electric energy allowed to be used. Alternatively, P1, P2, and P3 may be given by amounts of remaining electric energy.

As described above, by properly performing the calibration operation including forming of the patch image or the predictive calibration operation in response to a calibration trigger signal that is generated each time TC1 sheets are printed, it is possible to maintain high image quality with reduced electric energy consumption.

Second Embodiment

In a second embodiment described below, an amount of electric energy that will be consumed is predicted based on a history of electric energy consumption in the past, and the calibration interval is determined based on the prediction.

Figure 13:
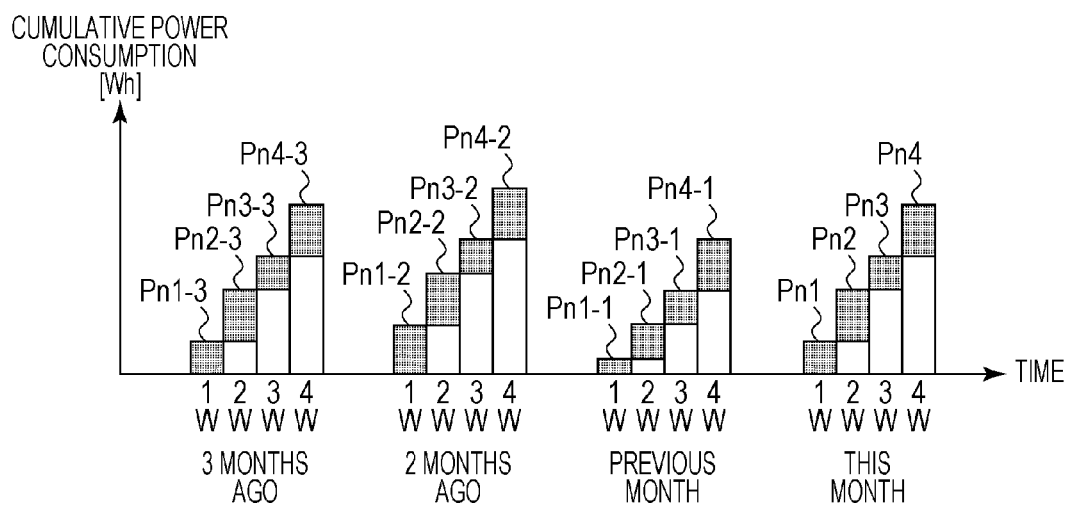
FIG. 13 is a diagram illustrating a history of electric energy consumption of an image forming apparatus.

FIG. 13 illustrates electric energy consumed in the past three month. In this figure, each vertical bar indicates the cumulative sum of electric energy consumed in one week. Let it be assumed that the electric energy allowed to be used by the image forming apparatus is defined for each month. For simplicity of illustrating, one month consists of exact four weeks. In FIG. 13, 1W, 2W, 3W, and 4W denote weeks, and a shaded part of each vertical bar denotes the amount of electric energy consumed in the week. Pn1-3 denotes the amount of electric energy consumed in the first week of a month 3 months ago, Pn2-3 denotes the amount of electric energy consumed in the second week of a month 3 months ago, Pn3-3 denotes the amount of electric energy consumed in the third week of a month 3 months ago, Pn4-3 denotes the amount of electric energy consumed in the fourth week of a month 3 months ago, and so on. At the beginning of this month, the CPU 151 predicts the amount of electric energy that will be consumed in each week of this month from the average values of amounts of electric energy consumed in the past three months. Let Pn1, Pn2, Pn3, and Pn4 denote the predicted amounts of electric energy that will be consumed in the first, second, third, and forth weeks of this month. Pn1 to Pn4 are calculated as follows.

$$Pn1=(Pn1\text{-}3+Pn1\text{-}2+Pn1\text{-}1)/3$$

$$Pn2=(Pn2\text{-}3+Pn2\text{-}2+Pn2\text{-}1)/3$$

$$Pn3=(Pn3\text{-}3+Pn3\text{-}2+Pn3\text{-}1)/3$$

$$Pn4=(Pn4\text{-}3+Pn4\text{-}2+Pn4\text{-}1)/3$$

The CPU 151 sets the calibration interval based on the predicted amounts of electric energy consumption.

FIGS. 14A to 14J each illustrate the amount of electric energy allowed to be used by the image forming apparatus in one month (this month), the amount of electric energy predicted from amounts of electric energy consumed in the past, and the amount of electric energy actually consumed. Let Pt denote the amount of electric energy allowed to be consumed by the image forming apparatus in one month. In a case where Pt is equal to or greater than the predicted amount of electric energy consumption in one month as in an example shown in FIG. 14A (i.e., in a case where Pt≥Pn1+Pn2+Pn3+Pn4), the calibration is performed each time the calibration trigger is generated.

Figure 14A:
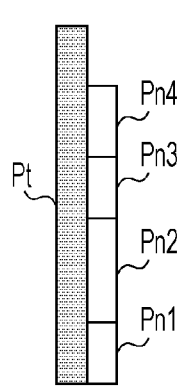
FIGS. 14A to 14J are diagrams illustrating amounts of electric energy allowed to be used by an image forming apparatus, amounts of electric energy predicted to be used, and amounts of electric energy actually used.
Figure 14B:
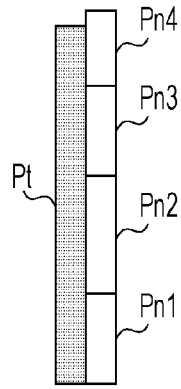

In a case where Pt is smaller than the predicted amount of electric energy consumption in one month as in an example shown in FIG. 14B (i.e., in a case where Pt<Pn1+Pn2+Pn3+Pn4), a predictive calibration is performed according to the procedure according to the first embodiment described above.

Figure 14C:
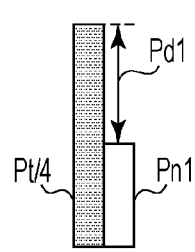
Figure 14D:
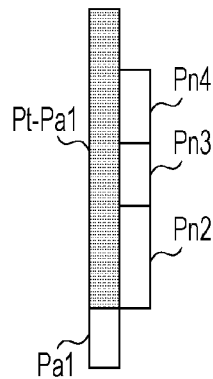
Figure 14E:
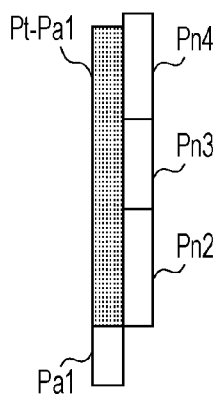

The calibration interval in the first week is set as follows. In FIG. 14C, Pd1 denotes electric energy determined by subtracting the predicted electric energy consumption Pn1 in the first week determined from the 3-month history data from Pt/4, i.e., the available electric energy in one month is equally divided into 4 weeks. When Pd1>P1, the calibration operation is performed each time the calibration trigger is generated. When P2<Pd1≤P1, the calibration operation is performed each time TC2 sheets are printed. When P3<Pd1≤P2, the calibration operation is performed each time TC3 sheets are printed. When Pd1≤P3, the calibration operation is performed each time TC4 sheets are printed.

The setting of the calibration interval in the second week is described below. Let Pa1 denote the electric energy actually consumed in the first week. In a case where a value obtained by subtracting the electric energy actually consumed in the first week from Pt is equal to or greater than the sum of predicted values of electric energy in the second to fourth weeks as in an example shown in FIG. 14D (i.e., when Pt−Pa1≥Pn2+Pn3+Pn4), the calibration is performed each time the calibration trigger is generated.

In a case where a value obtained by subtracting the electric energy actually consumed in the first week from Pt is smaller than the sum of predicted values of electric energy in the second to fourth weeks (i.e., when Pt−Pa1<Pn2+Pn3+Pn4), the predictive calibration is performed.

Figure 14F:
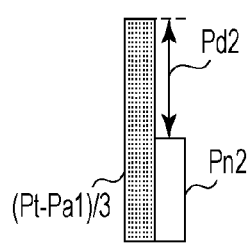

A specific method of setting the calibration interval in the second week is described below. In FIG. 14F, Pd2 denotes a value calculated as follows. First the electric energy Pa1 actually consumed in the first week is subtracted from the available electric energy in one month, and the resultant value is equally divided into the remaining three weeks such that each week has (Pt−Pa1)/3. Thereafter, the electric energy Pn2 which will be consumed in the second week, predicted based on the history of the past three month, is subtracted from the value (Pt−Pa1)/3. Thus, Pd2 is obtained. In a case where Pd2>P1, the calibration operation is performed each time the calibration trigger is generated. When P2<Pd2≤P1, the calibration operation is performed each time TC2 sheets are printed. When P3<Pd2≤P2, the calibration operation is performed each time TC3 sheets are printed. When Pd2≤P3, the calibration operation is performed each time TC4 sheets are printed.

The calibration interval in the third weeks is determined as follows. Let Pa1 and Pa2 denote the electric energy actually consumed in the first week and the second week, respectively. In a case where (Pt−Pa−Pa2)≥Pn3+Pn4 as in an example shown in FIG. 14G, the calibration is performed each time the calibration trigger is generated. On the other hand, in a case where (Pt−Pa1−Pa2)/2<Pn3+Pn4 as in an example shown in FIG. 14H, the calibration is performed on the predictive calibration basis.

Figure 14G:
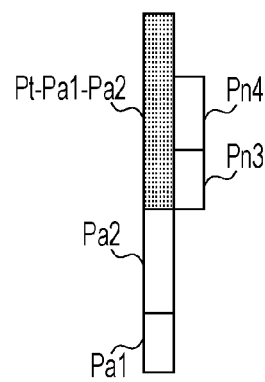
Figure 14H:
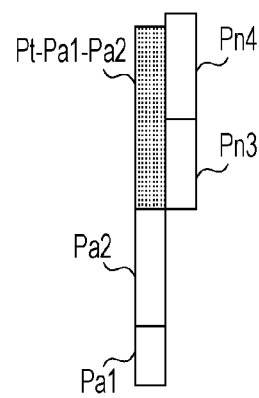
Figure 14I:
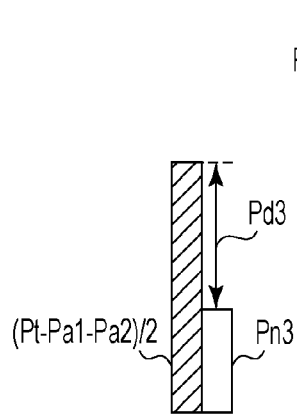
Figure 14J:
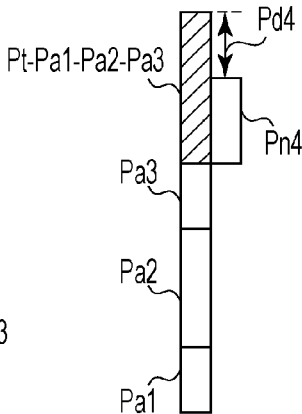

A method of setting the calibration interval in the third week is described below. In FIG. 14I, Pd3 denotes a value calculated such that the sum of the electric energy actually consumed in the first and second weeks is subtracted from the electric energy allowed to be used in one week, the result is equally divided into the remaining two weeks such that (Pt−Pa1−Pa2)/2, and furthermore the predicted electric energy Pn3 which will be consumed in the third week is subtracted from the above value (Pt−Pa1−Pa2)/2. In a case Pd3>P1, the calibration is performed each time the calibration trigger is generated. When P2<Pd3≤P1, the calibration is performed each time TC2 sheets are printed. When P3<Pd3≤P2, the calibration is performed each time TC3 sheets are printed. When Pd3≤P3, the calibration is performed each time TC4 sheets are printed.

A method of setting the calibration interval in the fourth week is described below. In FIG. 14G, Pd4 denotes a value calculated as follows. First, the sum of the electric energy, Pa1, Pa2, and Pa3 actually consumed in the first, second, and third weeks is subtracted from the electric energy allowed to be used in one week, i.e., Pt−Pa1−Pa2−Pa3 is calculated. Subsequently, the predicted electric energy Pn4 which will be consumed in the fourth week determined based on the history of electric energy consumed in the past three month is further subtracted from the above result Pt−Pa1−Pa2−Pa3. Thus, Pd4 is given by Pt−Pa1−Pa2−Pa3−Pn4. In a case where Pd4>P1, the calibration is performed each time the calibration trigger is generated. When P2<Pd4≤P1, the calibration is performed each time TC2 sheets are printed. When P3<Pd4≤P2, the calibration is performed each time TC3 sheets are printed. When Pd4≤P3, the calibration is performed each time TC4 sheets are printed.

As described above, by determining the calibration interval based the comparison between the electric energy allowed to be used by the image forming apparatus in a particular period and the electric energy actually used by the image forming apparatus in the past, it is possible to reduce the electric energy consumed by the image forming apparatus. Furthermore, the calibration trigger is generated each time TC1 sheets are printed. When the calibration trigger is generated, the calibration is performed in a mode properly selected from the two modes, i.e., the mode in which the calibration including forming the test pattern image is performed and the mode in which the predictive calibration is performed, whereby it is possible to maintain high image quality with reduced electric energy consumption.

In the embodiments described above, it is assumed that the upper limit of the electric energy consumption is defined for each image forming apparatus. Note that the embodiments may also be applicable to a case in which the total electric energy consumed by a plurality of image forming apparatuses connected to the network 402 is limited.

Further, the present exemplary embodiment may also be realized by supplying software (e.g., a program or a set of instructions) for realizing the functions of the above exemplary embodiments to a system or an apparatus via a network or via various storage media, and having a computer (a central processing unit (CPU) or a micro processing unit (MPU)) of the system or apparatus read and execute the program or the instructions recorded/stored on an article of manufacture having a memory device or a non-transitory storage medium to perform operations or functions of the above-described embodiments. In this case, this program and the recording medium on which the program is recorded/stored constitute one disclosed aspect of the embodiments. In addition, the program may be executed by one computer, or by a plurality of computers linked together.

Disclosed aspects of the embodiments may be realized by an apparatus, a machine, a method, a process, or an article of manufacture that includes a non-transitory storage medium having a program or instructions that, when executed by a machine or a processor, cause the machine or processor to perform operations as described above. The method may be a computerized method to perform the operations with the use of a computer, a machine, a processor, or a programmable device. The operations in the method involve physical objects or entities representing a machine or a particular apparatus (e.g., an image forming apparatus, a calibration unit). In addition, the operations in the method transform the elements or parts from one state to another state. The transformation is particularized and focused on calibrating an image forming apparatus. The transformation provides a different function or use such as performing a calibration operation, determining available electric energy, determining an interval at which to perform the calibration operation, etc.

In addition, elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any optical, electromechanical, electromagnetic, or electronic devices. The term software generally refers to a logical structure, a method, a procedure, a program, a routine, a process, an algorithm, a formula, a function, an expression, etc. A software implementation typically includes realizing the above elements (e.g., logical structure, method, procedure, program) as instruction codes and/or data elements embedded in one or more storage devices and executable and/or accessible by a processor, a CPU/MPU, or a programmable device as discussed above. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations.

All or part of an embodiment may be implemented by various means depending on applications according to particular features, functions. These means may include hardware, software, or firmware, or any combination thereof. A hardware, software, or firmware element may have several modules or units coupled to one another. A hardware module/unit is coupled to another module/unit by mechanical, electrical, optical, electromagnetic or any physical connections. A software module/unit is coupled to another module by a function, procedure, method, subprogram, or subroutine call, a jump, a link, a parameter, variable, and argument passing, a function return, etc. A software module/unit is coupled to another module/unit to receive variables, parameters, arguments, pointers, etc. and/or to generate or pass results, updated variables, pointers, etc. A firmware module/unit is coupled to another module/unit by any combination of hardware and software coupling methods above. A hardware, software, or firmware module/unit may be coupled to any one of another hardware, software, or firmware module/unit. A module/unit may also be a software driver or interface to interact with the operating system running on the platform. A module/unit may also be a hardware driver to configure, set up, initialize, send and receive data to and from a hardware device. An apparatus may include any combination of hardware, software, and firmware modules/units.

While the embodiments have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-282235 filed Dec. 17, 2010, which is hereby incorporated by reference herein in its entirety.

What is claimed is:

1. An image forming apparatus comprising:
    an image forming unit;
    a calibration unit configured to perform a calibration operation including forming a measurement image by the image forming unit to adjust an image forming condition;
    a determination unit configured to determine available electric energy allowed to be used by the image forming apparatus; and a control unit configured to determine an interval at which to perform the calibration operation based on the available electric energy determined by the determination unit and control the calibration unit to perform the calibration operation each time the determined interval is reached.

2. The image forming apparatus according to claim 1, wherein the control unit determines the interval at which to perform the calibration operation based on a ratio of the available electric energy to an upper limit of electric energy allowed to be used in a predetermined period.

3. The image forming apparatus according to claim 2, wherein the control unit determines the interval at which to perform the calibration operation such that the interval is longer for a case where the ratio is less than a predetermined threshold value than for a case where the ratio is equal to or greater than the predetermined threshold value.

4. The image forming apparatus according to claim 1, wherein the control unit determines the interval at which to perform the calibration operation such that the interval is longer for a case where the available electric energy is less than a predetermined threshold value than for a case where the available electric energy is equal to or greater than the predetermined threshold value.

5. The image forming apparatus according to claim 1, further comprising:
  a storage unit configured to store data indicating a calibration condition and a result of a calibration each time the calibration operation is performed;
  a generating unit configured to generate a trigger signal each time an image forming operation is performed on a predetermined number of sheets; and
  a predictive adjustment unit configured to adjust an image forming condition such that in a case where the trigger signal is generated when the determined calibration interval is not reached, the image forming condition is adjusted based on the calibration condition and the calibration result indicated by the data stored in the storage unit without forming the measurement image.

6. The image forming apparatus according to claim 1, wherein
  the image forming apparatus is connected to a power management apparatus via a network; and
  the determination unit receives data indicating the available electric energy from the power management apparatus.

7. The image forming apparatus according to claim 1, further comprising a second storage unit configured to store data indicating history associated with electric energy consumed by the image forming apparatus, wherein
  the control unit determines the calibration interval based on the available electric energy and the history associated with the electric energy indicated by the data stored in the second storage unit.

8. A method of calibrating an image forming apparatus comprising:
  performing a calibration operation by a calibration unit including forming a measurement image by an image forming unit to adjust an image forming condition;
  determining available electric energy allowed to be used; and
  determining an interval at which to perform the calibration operation based on the available electric energy and controlling the calibration unit to perform the calibration operation each time the determined interval is reached.

9. A computer-readable non-transitory storage medium having instructions that, when executed by a processor, cause the processor to perform operations comprising:
  performing a calibration operation by a calibration unit including forming a measurement image by an image forming unit to adjust an image forming condition;
  determining available electric energy allowed to be used; and
  determining an interval at which to perform the calibration operation based on the available electric energy and controlling the calibration unit to perform the calibration operation each time the determined interval is reached.

* * * * *